United States Patent [19]

Becker

[11] Patent Number: 4,634,018

[45] Date of Patent: Jan. 6, 1987

[54] IMPACT PLUG ASSEMBLY

[75] Inventor: Philip D. Becker, Southbury, Conn.

[73] Assignee: Buell Industries, Inc., Waterbury, Conn.

[21] Appl. No.: 811,678

[22] Filed: Dec. 20, 1985

[51] Int. Cl.⁴ .............................................. B65D 53/00
[52] U.S. Cl. .................................... 220/233; 220/323
[58] Field of Search ............... 220/233, 234, 315, 307, 220/314, 323

[56] References Cited

U.S. PATENT DOCUMENTS 3,944,107  3/1976  Wallace et al. ..................... 220/323
3,990,604  11/1976  Barnett et al. ....................... 220/323
4,091,962  5/1978  Van Buren, Jr. .................... 220/323
4,391,384  7/1983  Moore, III et al. ................. 220/315

Primary Examiner—George T. Hall
Attorney, Agent, or Firm—St. Onge Steward, Johnston & Reens

[57] ABSTRACT

An improved impact plug assembly is provided, said assembly having a plug for insertion into an aperture in a workpiece and a cooperating crossbar for locking the plug into place in the aperture, the improvement comprising at least one shear lip means formed in said crossbar outwardly of said plug adjacent said slots to engage said plug walls adjacent said slots, whereby said crossbar is captured in said plug.

6 Claims, 5 Drawing Figures

IMPACT PLUG ASSEMBLY

BACKGROUND OF THE INVENTION

(1) Field of the Invention

This invention relates to an improved impact or bang plug assembly comprising a plug and a mating crossbar, wherein the crossbar is reliably inhibited from separating from the plug before installation and use in a workpiece. More specifically, the crossbar is retained in diametrically opposed slots in the plug sidewalls by shear lip means formed in the crossbar adjacent and outside the sidewalls, whereby the crossbar is captured inside the slots and retained with the plug by the shear strength of the material forming the crossbar.

(2) Discussion of the Prior Art

Impact or bang plug assemblies are known in the prior art for engaging a workpiece to close or seal an aperture formed therein. A typical application for a bang plug is closing off circular openings in the sheet metal of an automobile underbody, which openings are cut so that the whole body may be dipped in a paint bath and excess paint residue will drain out through the openings.

The typical bang plug assembly comprises a circular plug of metal for insertion into a circular opening. The plug may be shaped like a shallow, thin, flat-bottomed bowl with a relatively flat bottom wall portion for extending across the aperture and adjoining sidewall portions for mating with the workpiece boundary defining the aperture.

An elongated crossbar comprising an angled strip of metal is positioned inside and above the plug bottom in diametrically opposed slots formed in the plug sidewall adjacent the bottom wall, with the two opposite ends of the crossbar protruding through these slots only a relatively short distance. The two opposing ends of the crossbar are retained inside the slots and therefore inside the plug, while the angled portion of the crossbar midway between the two ends is poised above the plug bottom, the total length of the crossbar being substantially greater than the diameter of the plug. The plug is placed in the sheet metal opening, and the crossbar is typically struck with a hammer in a direction toward the plug bottom, or downwardly. The ends of the crossbar are forced out through the slots as simultaneously the angled portion of the crossbar is forced downward, is straightened, and comes to rest on the bottom wall or landing platform of the plug. The crossbar ends, which are suitably curved, are thereby driven or extended out through the slots into engagement with the underside of the sheet metal workpiece adjacent the aperture to lockingly retain the plug in place.

Before the plug assembly is installed and the crossbar driven into place, the crossbar sits relatively loosely in the plug and is typically retained in the slots by circular depressions or dimples formed in the crossbar material just on the outer side of the plug sidewalls. These dimples are designed to restrain the crossbar ends from being pulled or otherwise deformed back through the slots.

The spring action in the dimple transverse to the direction of travel of the crossbar through the slot permits the crossbar material in the region of the dimple to flex or be momentarily displaced as the dimple passes through the slot. There is a specific spring constant associated with the dimple that permits this flexing to take place. This spring or flexing action may permit the dimple to be pulled or forced back through the slot, thereby possibly resulting in the undesirable separation of the crossbar from the plug as the plug assemblies are shipped in mass or otherwise handled prior to installation.

A particular shortcoming of this prior art bang plug assembly is that, notwithstanding the dimples, the crossbar has a tendency to separate from the plug before installation and use. This is a substantial problem for both the bang plug manufacturer and also the end user, because a bang plug without a matching crossbar is virtually useless and a bang plug with a partially detached crossbar is a nuisance.

SUMMARY OF THE INVENTION

An improved impact plug assembly of the type having a plug and a cooperating crossbar is provided, whereby the crossbar is captured in diametrically opposed slots in the plug sidewalls by at least one shear lip means formed in opposite ends of the crossbar outwardly of the plug. The shear lip means is adapted to engage the plug walls adjacent said slots and capture the crossbar against inward removal by virtue of the shear strength of the material forming the shear lip means.

In a particularly preferred embodiment, the shear lip means may comprise at least one protuberance projecting from a first side of the crossbar and a corresponding indentation in a second, opposite side of the crossbar. The shear lip means may also comprise a protruding abutment surface substantially perpendicular to the surface of the crossbar adjacent the protuberance, and the abutment surface may be a substantially curved portion aligned for engaging the plug wall when the crossbar is urged inwardly of the plug.

It is an object of the present invention to provide an improved impact plug assembly where the crossbar is captured inside the plug.

It is a further object of the present invention to provide an improved impact plug assembly where the crossbar cannot be removed from the plug without substantially exceeding the shear strength of the material forming the crossbar.

It is a further object of the present invention to provide an improved impact plug assembly where the crossbar can be relatively easily inserted into the plug sidewalls, but is then captured therein against removal from the plug.

Further objects and advantages of the present invention will become apparent from the following description of the drawings and preferred embodiment.

DETAILED DESCRIPTION OF THE PREFERRED EMBODIMENT

Figure 2:
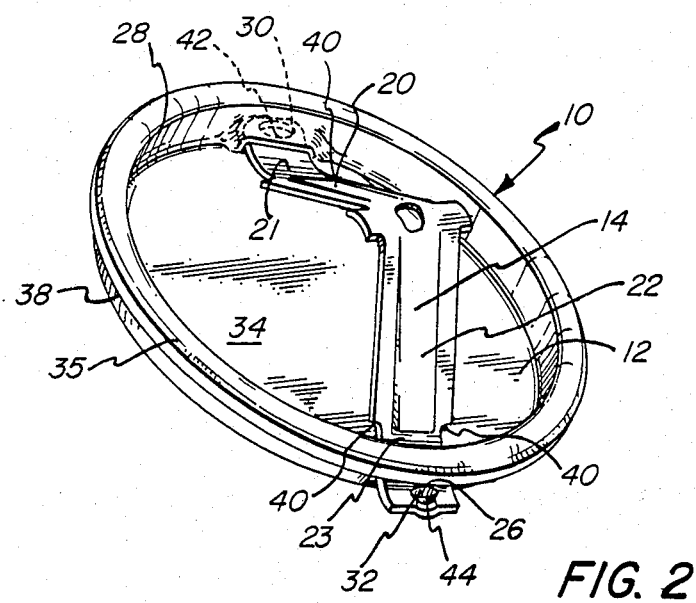
FIG. 2 shows a perspective view of the improved impact plug assembly of FIG. 1.
Figure 1:
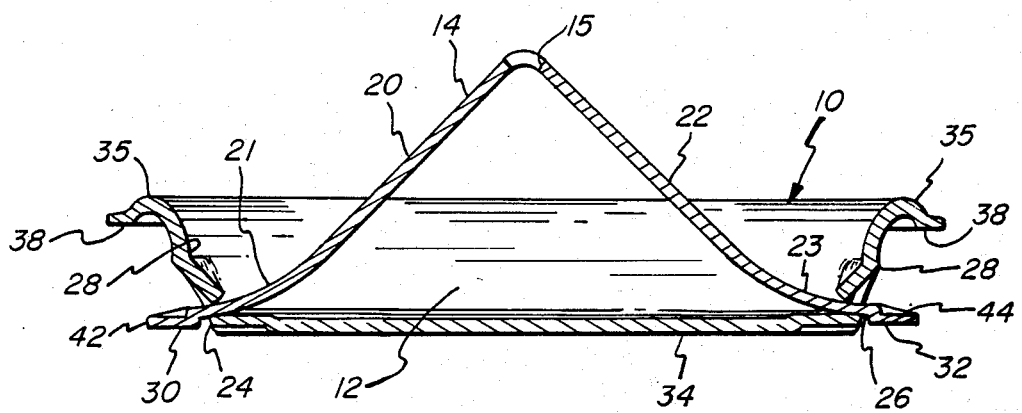
FIG. 1 shows a cross-sectional side view of the improved impact plug assembly of the present invention in an uninstalled condition.

As seen in FIGS. 1 and 2, the improved impact plug assembly 10 of the present invention comprises a plug 12 and an elongated crossbar 14. Plug 12 is generally stamped or pressed from a sheet of metal such as 1010 steel and may be treated by galvanizing to prevent corrosion, although the plug may also be formed of other materials such as aluminum. Plug 12 is disc shaped and resembles a relatively shallow, flat-bottomed bowl. Plug 12 has a bottom wall 34 for extending across the aperture formed in the workpiece. Plug 12 further has sidewalls 28 joining the bottom wall 34. Sidewalls 28 are typically of uniform depth around the entire perimeter and terminate in a rim 35. Rim 35 forms a flange 38 for engaging the workpiece adjacent the aperture as described below. When the plug is locked into the aperture as described below, the flange 38 sealingly engages the workpiece to seal the aperture.

As shown in FIG. 2, plug 12 is typically circular and can be of any chosen diameter to fit into and seal a generally circular aperture. It is understood however that any shape plug corresponding to any shape aperture can in principle be used consistently with the present invention.

The plug 12 is retained in place in the aperture by means of crossbar 14 that is forced, typically by impact, into a locking position after the plug 12 is positioned or inserted into the aperture to be sealed.

Crossbar 14 comprises an elongated strip of metal having two legs 20 and 22, which terminate in feet 21 and 23. Legs 20 and 22 join at an angle at region 15 opposite the feet to form crossbar 14. Feet 21 and 23 are suitably curved to firmly engage the underside of the workpiece when crossbar 14 is driven into the locked position. Feet 21 and 23 extend through two diametrically opposed slots 24 and 26 in plug sidewall 28 only a relatively short distance in the uninstalled state so that the plug 12 can be readily inserted into the aperture. During installation, the feet are extended outwardly as the crossbar 14 is driven into place. The crossbar 14 has shaped or shoulder portions 40 adjacent the feet 21 and 23 to permit the feet to extend through the slots 24 and 26, while maintaining substantial equality of the distance both feet protrude in the installed state. The bottom portion 34 of the plug 12 also serves as a landing platform for receiving the crossbar 14 as it is driven into the locked position.

Crossbar 14 is typically made of the same material as plug 12, although different materials may be used so long as no undesirable electrochemical or other reactions are set up where the crossbar and the plug touch each other.

Figure 2A:
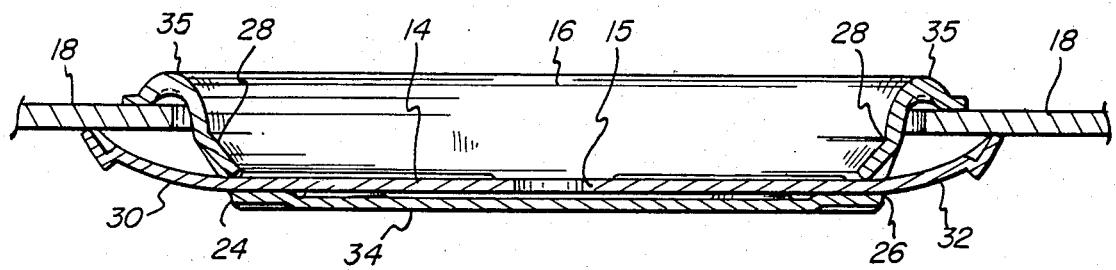
FIG. 2A shows a cross-sectional side view of the improved impact plug assembly of FIG. 2 after installation.

When the crossbar 14 is forced into the locking position, the ends 30 and 32 of the crossbar 14 are extended through corresponding diametrically opposed slots 24 and 26 in the sidewalls 28 of the plug 12 to engage the workpiece and force the rim 35 and flange 38 into a sealing position against the workpiece. This locked position is shown in FIG. 2A, where aperture 16 has been closed off by plug 12, locked in place against the workpiece 18 by having crossbar 14 impacted at region 15, such as by striking it with a hammer, to force the crossbar ends through the diametrically opposed slots to engage the workpiece 18.

When the assembly 10 is in an unengaged state as shown in FIG. 1, it is important that crossbar 14 not become separated from plug 12, as a plug without a crossbar is useless. The slots 24 and 26 are sized somewhat larger than the feet 21 and 23 extending therethrough so that the crossbar 14 can be driven into place relatively easily. Consequently, adequate means must be provided to insure that the crossbar is not forced or does not work its way inwardly and out of the slots. If only one foot 21 slips or is forced out of its corresponding slot 24, the worker who uses the plug assembly must reinsert or reposition foot 21 and corresponding leg 20 so that it may be banged through slot 24 to install plug 10. This causes an unnecessary interruption in operations. While the feet of the crossbar must not be easily removable back through the slots once the crossbar has been so inserted, it is also important that the crossbar be relatively easy to insert in the slots in the first place.

Figure 3:
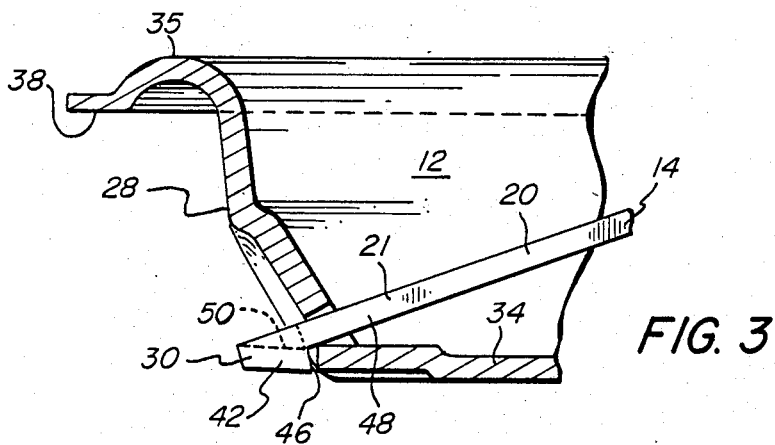
FIG. 3 shows an enlarged cross-sectional side view of a portion of the improved impact plug assembly of FIG. 1.
Figure 4:
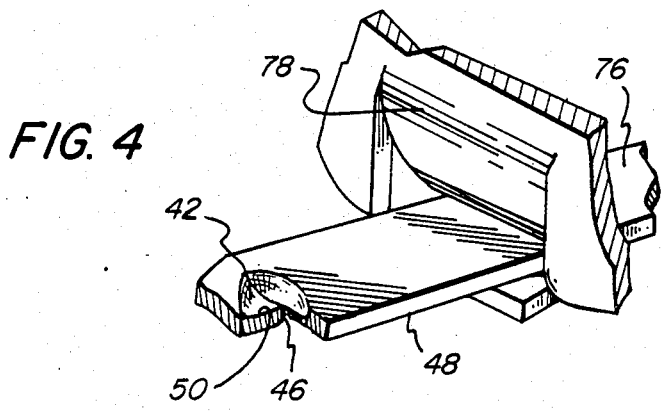
FIG. 4 shows a detailed perspective view of the shear lip of the present invention.

The improved plug assembly of the present invention is shown more clearly in FIGS. 3 and 4, which are substantially enlarged and more detailed depictions of portions of the impact plug assembly shown in FIGS. 1 and 2. FIGS. 3 and 4 show shear lip means 42 formed in one end or foot 21 of crossbar 14. Shear lip means 44 is shown in FIGS. 1 and 2 in the other foot 23. Shear lip 42 is formed by displacing or shearing a portion of the material of the crossbar 14 downward to form a protruding abutment surface 46, which is preferably substantially perpendicular to the adjacent flat surface 48 of crossbar 14. However, the angle is not crucial so long as the shear lip is sufficiently abrupt to provide a good register against the plug sidewall. The abutment surface strikes the plug sidewalls adjacent the slot and prevents the crossbar from being removed. This shear lip may be formed by a circular die pressing into the crossbar at some acute angle thereto to shear or displace a half-moon or fingernail shaped portion of the material downwardly to form shear lip 42. This portion may be curved depending upon the shape of the die. This generates a protuberance projecting from the side of the crossbar opposite the side struck by the die, and also creates a corresponding indentation 50 in the opposite side. This die or other stamping implement need not be circular, but can be of any suitable configuration for producing a shear lip of any size and shape.

With the shear lip 42 of the present invention shown in detail in FIG. 4, insertion outwardly through slot 76 in plug sidewall 78 may be accomplished with relative ease. However, once inserted the crossbar is captured in the plug sidewall 78 and is extremely difficult to pull backward or remove without either exceeding the shear strength of the crossbar material or tearing the sidewall material of the plug. This design utilizes the shear strength of the material, which is typically several orders of magnitude greater than its spring of flex strength, to substantially increase the probability of holding the crossbar and the plug together.

It should be understood that various changes and modifications to the preferred embodiments described above will be apparent to those skilled in the art. Such changes and modifications can be made without departing from the spirit and scope of the present invention, and it is therefore intended that such changes and modifications be covered by the following claims.

I claim:

1. An improved impact plug assembly for engaging a workpiece to close an aperture extending through said workpiece, said assembly of the type having a plug for insertion into said aperture and a cooperating crossbar retained in diametrically opposed slots formed in the walls of said plug, said bar for being extended outwardly through said slots to lockingly engage said workpiece and sealingly retain said plug in said aperture, said crossbar being restricted from removal inwardly through said slots to separate said bar from said plug before use of said assembly, the improvement comprising at least one shear lip means formed in said crossbar outwardly of said plug adjacent said slots, said shear lip means being adapted to engage said plug walls adjacent said slots whereby said crossbar is captured in said plug.

2. The improved plug assembly of claim 1, wherein the shear lip means comprises at least one protuberance projecting from a first side of the crossbar and a corresponding indentation in a second side of the crossbar.

3. The improved plug assembly of claim 1, wherein the shear lip means comprises a protruding abutment surface substantially perpendicular to a first surface of the crossbar adjacent the protrusion.

4. The improved plug assembly of claim 3 where the abutment surface comprises a substantially curved portion aligned for engaging the plug wall when the crossbar is urged inwardly of the plug.

5. The improved plug assembly of claim 1, wherein the crossbar is elongated and has a first and a second end extending through first and second slots, said bar further having first and second shear lips formed adjacent said first and second ends respectively outwardly of said plug, whereby said bar is captured inside both said slots by the shear strength of said shear lip.

6. The improved plug assembly of claim 5, wherein the crossbar comprises first and second elongated legs joined to each other at one end, said first and second legs extending through said first and second slots respectively at their ends opposite said joined end, and each said leg has at least one shear lip adjacent each said opposite end to capture the crossbar inside said slots.

* * * * *